United States Patent [19]

Bahr et al.

[11] 4,063,255

[45] Dec. 13, 1977

[54] ELECTRO EROSION PRINTING HEAD

[75] Inventors: Dietrich Juergen Bahr; Karl Heinz Burckardt, both of Herrenberg, Germany

[73] Assignee: International Business Machines Corporation, Armonk, N.Y.

[21] Appl. No.: 696,975

[22] Filed: June 17, 1976

[30] Foreign Application Priority Data

July 10, 1975 Germany .............................. 2530888

[51] Int. Cl.$^{2}$ ....................... G01D 15/16; G01D 15/10

[52] U.S. Cl. ............................... 346/139 C; 346/76 R; 346/155

[58] Field of Search .................. 346/76 R, 139 C, 155

[56] References Cited

U.S. PATENT DOCUMENTS

| | | | |
|---|---|---|---|
| 3,161,457 | 12/1964 | Schroeder et al. | 346/76 R |
| 3,683,126 | 8/1972 | Krause | 346/139 C UX |
| 3,911,447 | 10/1975 | Ortlieb | 346/139 C X |
| 3,955,204 | 5/1976 | Anton | 346/139 C |
| 3,971,042 | 7/1976 | Ring | 346/139 C |

FOREIGN PATENT DOCUMENTS

| | | | |
|---|---|---|---|
| 709,521 | 5/1965 | Canada | 346/76 R |

*Primary Examiner*—George H. Miller, Jr.
*Attorney, Agent, or Firm*—James A. Ruth

[57] ABSTRACT

Guiding electrodes are built into the printing head of an electro-erosion printer using metalized paper for the purposes of equalizing paper pressure upon the printing surface of the head and prevention of irregular abrasion of the writing styli thereby leading to an improvement in the uniformity of contact pressure such as to consequently enhance printing quality.

7 Claims, 6 Drawing Figures

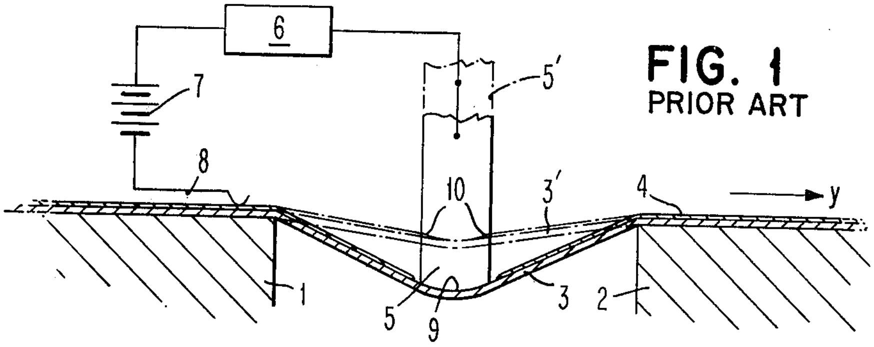
FIG. 1
PRIOR ART
FIG. 2
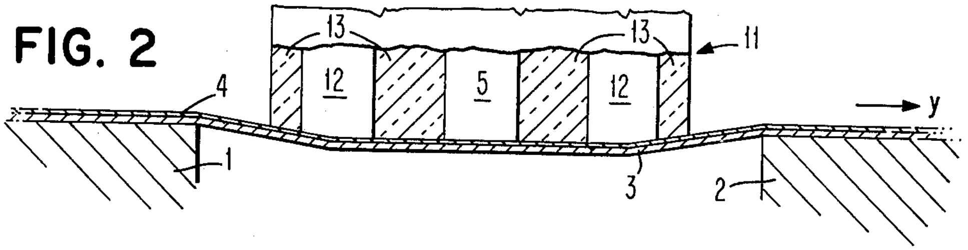
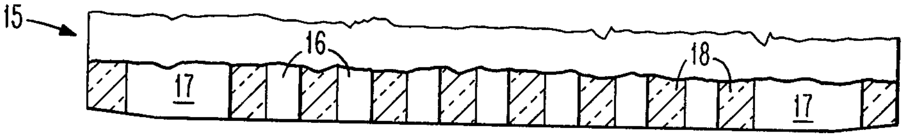
FIG. 3A
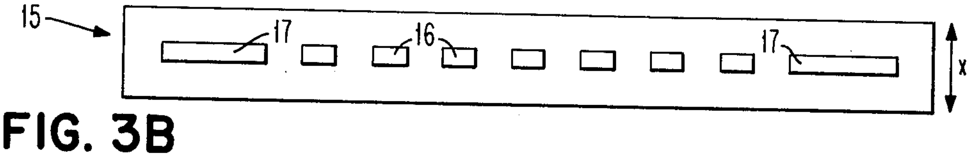
FIG. 3B
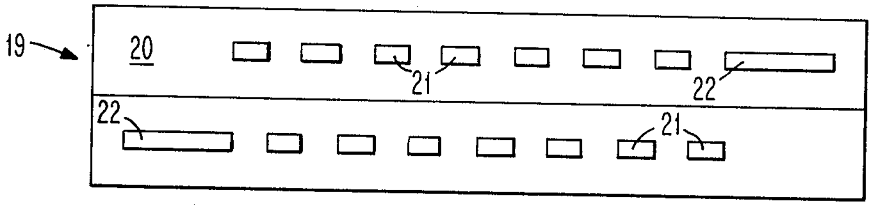
FIG. 4
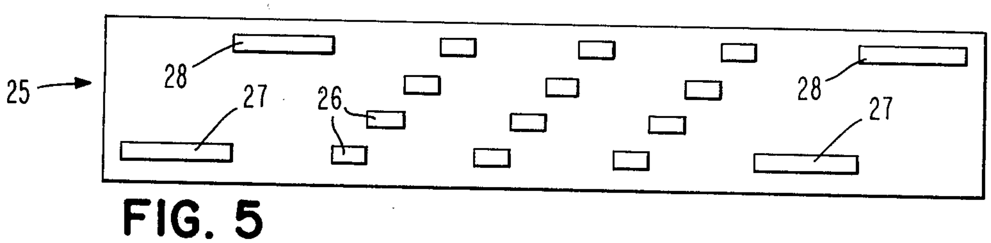
FIG. 5

ELECTRO EROSION PRINTING HEAD

BACKGROUND OF THE INVENTION

1. Field of the Invention

This invention relates to apparatus for writing on a recording medium of the type having a paper backed metallic layer which on contact with an energized stylus tip results in an electric erosion, or burn out, of the metalized layer at the point of contact so as to form an element of a printed character.

In the use of apparatus of this type, problems have been encountered in securing sharply defined character element by electro-erosion of the metalized layer because of wear by abrasion of the printing styli and also in securing a uniform contact pressure of the metalized paper with the styli. These problems have been known in the prior art, for example, from German Pat. No. 1,110,437 it is known that provision of a groove placed directly below the printing electrodes, or styli, serves to equalize contact pressure over the printing electrodes in a direction parallel to that of the movement of the recording medium. Another German Pat. No. 2,312,846 discloses printing styli having rounded surfaces at the point of contact with the recording medium for the same purpose.

U.S. Pat. No. 3,922,477 provides redundant electrodes, or styli, between adjacent writing electrodes where these redundant electrodes are at electrical ground potential to prevent bridging of adjacent writing electrodes by electrically conductive whiskers generated by the electro-erosion process.

2. Brief Summary of the Invention

Printing heads for electro-erosion printers generally have a plurality of writing electrodes or styli such that as the recording medium is pulled past the printing head and the writing electrodes are selectively impulsed with writing current, characters will be written element by element on the recording medium in a direction transverse or perpendicular to the direction of recording medium movement.

As the size of an electro-erosion printing head is increased so as to transversely contact a longer and longer printing line across the recording medium, contact pressure of the head against the medium departs from uniformity along the length of the printing line. Contact pressure varies from a high pressure at the ends of the line to a lower pressure in the middle. Abrasion of the writing electrodes is a function of contact pressure. Thus, the writing electrodes at the ends of the printing line are abraded more severely than those in the center. Also, should the printing head contain plural lines of styli, then those styli in the lines contacting the recording medium nearest the edges of the supporting groove beneath the recording medium are worn at a faster rate than the middle lines of writing styli.

Briefly, those problems are solved by the addition to the printing head of a number of blind or guiding electrodes placed at the ends of the long dimension of the printing head such that wear by abrasion affects these blind elements rather than affecting the writing styli themselves.

Accordingly, it is an object of this invention to reduce wear on the writing styli of an electro-erosion printing head.

Another object of the invention is to equalize and make the contact pressure of the recording medium more uniform along a line or lines of writing styli.

Another object of the invention is to improve the quality of electro-erosion printing over the lifetime of a printing head and to lengthen the useable lifetimes of electro-erosion printing heads.

DESCRIPTION OF THE DRAWINGS

The invention is further described with reference to the accompanying drawing in which:

FIG. 1 illustrates the prior art and introduces the problems currently surrounding electro-erosion printing heads;

FIG. 2 shows an individual writing electrode provided with fore and aft blind electrodes in accord with principles of the invention;

FIGS. 3A and 3B, respectively, show a side and bottom view of a line of plural writing electrodes designed in accordance with the invention;

FIG. 4 shows a bottom view of another electro-erosion printing head designed in accordance with the invention and;

FIG. 5 shows a bottom view of yet another electro-erosion head designed in accordance with the invention.

DETAILED DESCRIPTION OF THE PREFERRED EMBODIMENTS

FIG. 1 shows an individual electrode 5 contacting with a metal-coated recording medium 3 which is being drawn past the electrode by paper transport means not shown. Recording medium 3 passes over a bearing bed parts 1 and 2 having a groove cut there between in the manner of German Pat. No. 1,110,437 and is pressed downwardly by electrode 5 in order to secure an adequate contact pressure therewith. In operation, as the metal-coated recording medium is drawn past the writing electrode, or stylus, abrasion will round the contact surface 9 of the stylus as shown. Writing is effected by operation of a control circuit 6 the details of which are known from the prior art. Voltage is applied from a power source 7 whose other pole is connected to the metal coating 4 of recording medium 3 by a sliding contact 8. When the voltage is applied to the stylus, metal coating 4 is burnt off the recording medium within the contact area 9 of the writing stylus.

Electrode 5 can be moved in and out of the plane of the drawing so as to erode writing tracks or elements normal to the direction of the recording medium transport Y as well as vertically to the horizontal plane so as to compensate for wear through abrasion that will occur and also so as to decrease the amount of depression of the recording medium 3' as shown by worn electrode 5'. When the depression of the recording medium by the stylus becomes gradually smaller but at a rate faster than the stylus itself wears, spaces 10 appear at the meeting and trailing edges of the stylus and have the effect of reducing the area of the recording medium in contact with the stylus. Alteration of the contact pressure and reduction of the contact surface 9 results in increased surface pressure and thus increased abrasion as well as a decrease in the width of the burnt off or eroded character element. If the electrical power supplied to the stylus is unchanged, the current density over the remaining contact area increases giving rise to heating of the stylus electrode. This condition may result in exceeding the heat capacity of the electrode such that melting occurs at surface 9. When that happens, the writing surface is no longer smooth and the consequent irregularities quite often cause tearing of the metal layer on the recording medium and this, of course, results in severe degradation of the writing quality. One such result is that characters often end with either a ragged edge or a tapering into a so-called "flag" of melted metal. In an arrangement similar to that of FIG. 1, FIG. 2 shows an improved electro-erosion head structure 11 according to the principle of this invention where, added fore and aft of the electrode 5, are two blind or guide electrodes 12. Neither of these blind electrodes are connected to the source of power 7 in any way and they are insulated from the writing electrode by insulation 13. Blind guide electrodes take over from the writing electrode the function of depressing the recording medium between supports 1 and 2 and the wear through abrasion resulting from pulling and record means over the complete head. In this arrangement wear of the writing electrode is greatly reduced and an electro-erosion printing head with blind electrodes has a consequent large increase in its serviceable life. As the blind electrodes act to preserve the geometry of the improved head even as they themselves are worn by abrasive conditions, their protection of the geometry of the writing heads directly leads to maintenance of high writing quality over the service life of the head.

FIGS. 3A and 3B show an elongated electro-erosion printing head having a plurality of writing electrode 16 and a pair of blind or guide electrodes 17 disposed at each end of the head in its long dimension. Each writing electrode is insulated from each other writing electrode and also from the blind guide electrode by insulation 18. As in FIG. 2 where the blind guide electrodes 12 are not connected to any source of power or ground potential the same holds true of electrodes 17 in that they are not either grounded nor connected to a source of power. The X at the right of FIG. 3 indicates the direction of travel of the recording medium not shown past the head. Printing heads of the type shown in FIGS. 3A and 3B are specially adapted to print characters by marking the recording medium element by element in a 5 by 7 character matrix through the use of known circuitry in control unit 6.

Blind guiding electrodes 17 are made larger than the writing electrodes in order to withstand the increased surface pressure existing at the edges of the head where it contacts the recording medium. The size of the blind guide electrodes 17 is also dependent on the increased probability of abrasion due to the increased surface pressure and they are made sufficiently longer so that their wear will approximate the wear of the writing electrode thereby preserving the original geometry of the head so that writing quality is maintained for a maximum amount of service life, preferably the contact cross-section area of the blind guide electrodes is 2 to 5 times the contact area of an individual writing electrode.

FIG. 4 shows another embodiment of an electro-erosion printer head 19 having two lines of seven writing electrodes 21 each where the writing electrodes 21 of one line are offset from the writing electrodes of the other line by the major dimension of a single writing electrode. As shown in previous figures, these writing electrodes are also protected by line guide electrodes 22 that function as previously described. An electrode-erosion printing head of the type shown in FIG. 4 is especially adapted to the printing of graphical data in addition to the normal use of printing letter and number characters.

In similar fashion FIG. 5 shows another arrangement of writing and blind guide electrodes in an electro-erosion printing head where both the writing electrodes 26 and the blind electrodes 27 and 28 are offset one from the other. In this particular arrangement the complete writing area can be covered by the writing electrodes and a head of this type is adapted to burn out an entire area of metal-coated recording medium contacting the writing area of the head.

In all the figures, the dimensions of the individual writing electrodes depends on the desired character resolution. Generally speaking, the long dimension of a single electrode lies between 30 and 250 micrometers while the short dimension amounts to about one-third to one-half of the long dimension.

What has been described is an improved structure for an electro-erosion printing head, wherein blind non-energized electrodes are built into the edges of a printing head acting to redistribute and thus to equalize contact pressure of the metallized paper over the whole of the surface of all the writing electrodes as the paper is drawn over and past them.

What is claimed is:

1. A printing head for electro-erosion printing upon a web carrying a metallic layer adapted for burnt out marking, or erosion, comprising in combination, a plurality of writing electrodes each insulated from the others all being in contact with said metallic covered web and plural blind guide electrodes insulated from each other and from all the writing electrodes whereby the blind guide electrodes are adapted to assume a relatively greater amount of wear than do the writing electrodes and to provide a uniform contact pressure of the metallic layered web upon the writing electrodes.

2. Apparatus as claimed in claim 1, wherein cross-section area of the blind guide electrodes is 2 to 5 times the cross-sectional area of the writing electrodes.

3. Apparatus as claimed in claim 1, wherein said plurality of writing and blind guide electrodes are disposed along a single line.

4. Apparatus as claimed in claim 3, wherein said blind guide electrodes are placed at the extreme ends of said single line of electrodes.

5. Apparatus as claimed in claim 1, wherein said plurality of writing electrodes are disposed along plural lines and where each of said plural lines contains a single blind guide electrode.

6. Apparatus as claimed in claim 5, wherein said blind guide electrodes are alternately right and left on different adjacent lines of writing electrodes.

7. Apparatus as claimed in claim 6, wherein the positions writing electrodes of one line are offset with respect to the positions of the writing electrodes located along an adjacent line.

* * * * *